United States Patent [19]

Nagano

[11] Patent Number: 4,850,940

[45] Date of Patent: Jul. 25, 1989

[54] ADJUSTING MECHANISM FOR A CHAIN GUIDE AT A BICYCLE DERAILLEUR

[75] Inventor: Masashi Nagano, Izumi, Japan

[73] Assignee: Shimano Industrial Company Limited, Osaka, Japan

[21] Appl. No.: 281,970

[22] Filed: Dec. 6, 1988

Related U.S. Application Data

[63] Continuation of Ser. No. 201,039, Jun. 1, 1988, abandoned.

[30] Foreign Application Priority Data

Jun. 6, 1987 [JP] Japan .................. 62-87868[U]

[51] Int. Cl.⁴ .............................................. F16H 11/08
[52] U.S. Cl. ........................................ 474/80; 474/82
[58] Field of Search .................................. 474/77–82

[56] References Cited

U.S. PATENT DOCUMENTS 4,037,484 7/1977 Morse ................................ 474/82
4,530,677 7/1985 Nagano .............................. 474/80

FOREIGN PATENT DOCUMENTS 0032049 7/1981 European Pat. Off. .
3712159 10/1987 Fed. Rep. of Germany ........ 474/82
56-99869 8/1981 Japan .

OTHER PUBLICATIONS

AEZ: Radmarkt Nr. 9/1980, pp. 100–102.

Primary Examiner—Thuy M. Bui
Attorney, Agent, or Firm—Stevens, Davis, Miller & Mosher

[57] ABSTRACT

An adjusting mechanism which can adjust the axial portion of a chain guide at a bicycle derailleur by movement of a cylindrical holder, which is larger in diameter than a horizontal shaft supporting the chain guide, with respect to a housing at the movable member.

6 Claims, 4 Drawing Sheets

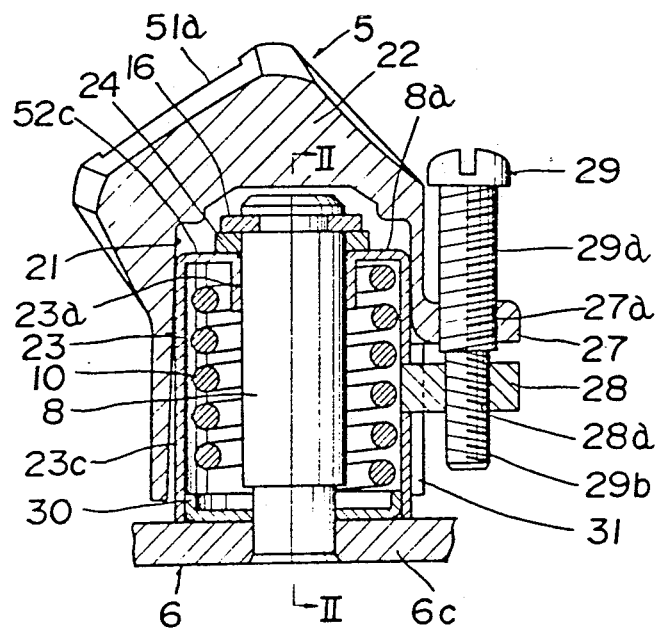
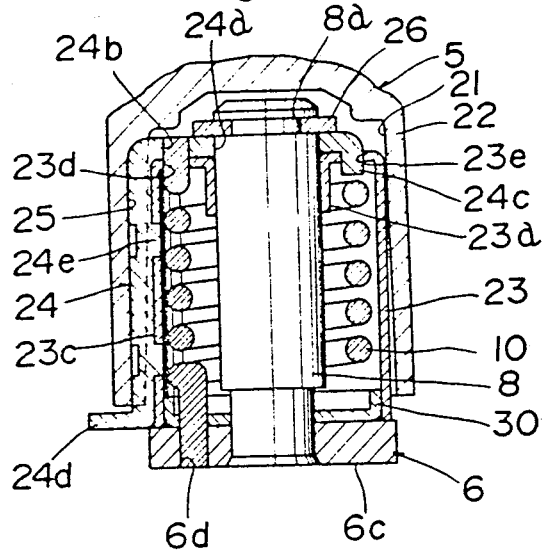

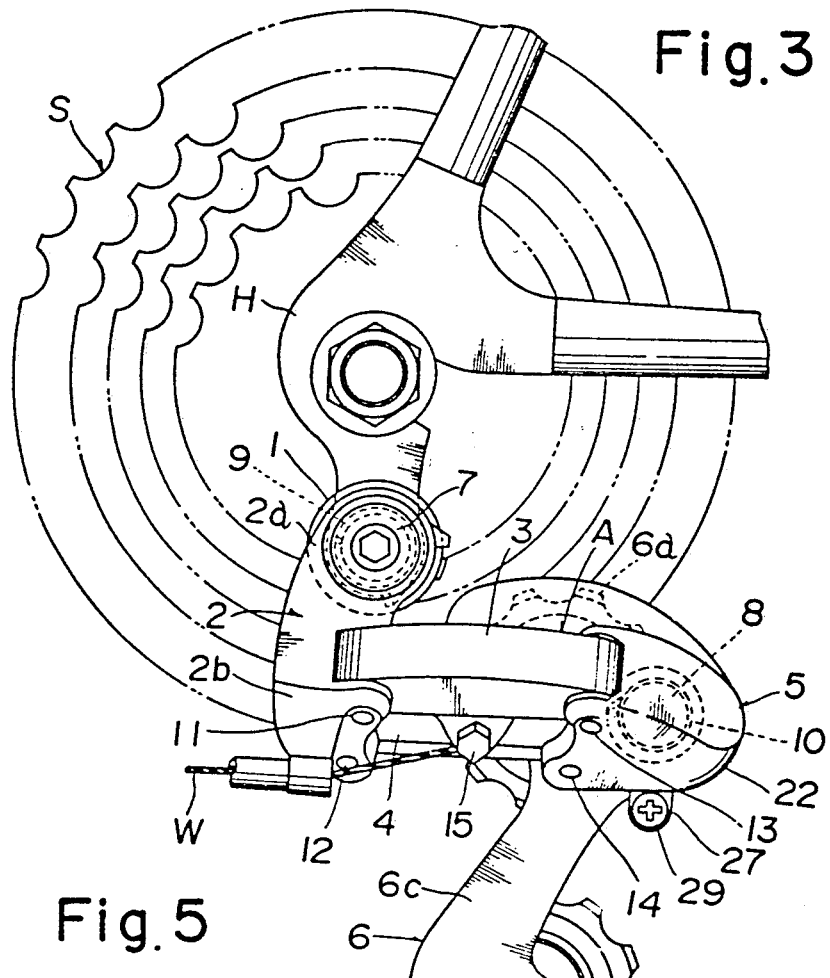
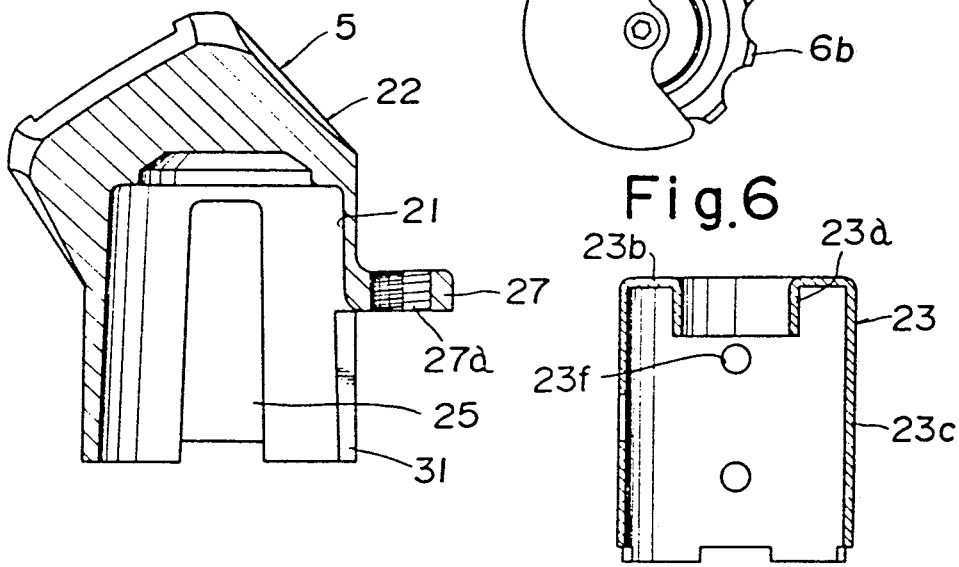

ADJUSTING MECHANISM FOR A CHAIN GUIDE AT A BICYCLE DERAILLEUR

This application is a continuation of application Ser. No. 201,039, filed June 1, 1988 now abandoned.

FIELD OF THE INVENTION

The present invention relates to an adjusting mechanism for a chain guide of a bicycle derailleur, and more particularly, to an adjusting mechanism for adjusting the axial position of the chain guide with respect to a multistage sprocket assembly of the bicycle.

BACKGROUND OF THE INVENTION

Generally, a bicycle derailleur, as disclosed in Japanese Utility Model Publication Gazette No. Sho 55-10217, is provided with a base member, a linkage mechanism comprising a support member, a pair of linkage members and a movable member, and a chain guide for guiding a driving chain from one sprocket to another of a multistage sprocket assembly mounted to the bicycle. The support member is supported swingably to the base member, and the chain guide is swingably mounted to the movable member through a horizontal shaft. A spring is interposed between the movable member and the chain guide, thereby applying tension to the chain guide.

The base member is fixed to a fork end of the bicycle frame, with the chain guide being disposed radially outwardly of the multistage sprocket assembly.

The conventional derailleur which includes a chain guide capable of being adjusted in its axial position with respect to the multistage sprocket assembly is well-known as disclosed in Japanese Patent Publication Gazette No. Sho 56-99869.

The conventional derailleur is constructed such that the movable member comprises a pair of connectors for connecting the linkage members and a pair of mounting members each having a non-round bore. A rotor having a threaded bore is supported rotatably only between the mounting members, the horizontal shaft is mounted rotatably to the horizontal shaft. A tension spring is provided around the outer periphery of the horizontal shaft, and a screw-thread provided at the outer periphery of one end of the horizontal shaft is supported axially movably only to non-round bores in the mounting members. The rotor and a lock nut screw with the screw thread at the horizontal shaft. As a result, the rotor is rotated to axially move the horizontal shaft together with the chain guide, thereby enabling the chain guide to be adjusted in its axial position with respect to the multistage sprocket assembly.

In the conventional derailleur, the rotor screws with the screw thread at the horizontal shaft and the tension spring is supported to the horizontal shaft at the reverse side to the screw thread, thereby increasing the overall length of the derailleur, and in turn the derailleur has increased size at the horizontal shaft position, thereby creating a problem in that the derailleur is prone to hit external objects. The horizontal shaft, which is supported to the mounting members axially movably with respect to the movable member, and the movable member itself, are easily broken by striking such external objects. Also, the lock nut is screwed with the end of the horizontal shaft to prevent a backlash thereof, thereby increasing an axial length of the horizontal shaft, and in turn the size of the derailleur is further enlarged. Furthermore, the horizontal shaft and tension spring are exposed to the exterior, thereby being non-protectable.

SUMMARY OF THE INVENTION

In light of the above problems, the present invention has been designed. An object thereof is to provide an adjusting mechanism for the chain guide of a bicycle derailleur, which can adjust the chain guide in its axial position with respect to the multistage sprocket assembly and also enable the derailleur to have a small axial length at its part including the horizontal shaft and increase the durability thereof to thereby protect the horizontal shaft and spring.

The adjusting mechanism of the invention, which adjusts a chain guide of a bicycle derailleur in its axial position with respect to a multistage sprocket assembly, is provided with a horizontal shaft having its axis extending axially of the multistage sprocket assembly and supporting the chain guide, a housing having a socket for receiving therein the horizontal shaft and movable therearound relative to the chain guide, a cylindrical holder insertably supported into the socket of the housing to be movable axially of and non-rotatable relative to the horizontal shaft and supported to the horizontal shaft to be non-axially-movable but rotatable, a horizontal shaft side member fixed to the horizontal shaft, a spring comprising a coil portion inserted into the cylindrical holder, a first end retained to the cylindrical holder and a second end retained to the horizontal shaft side member, and an adjusting means provided between the housing and the cylindrical holder for adjusting the cylindrical holder in its axial position with respect to the housing and adjusting the chain guide in its axial position.

The present invention is characterized in that first the housing having the socket is provided preferably at the movable member constituting the derailleur, the cylindrical holder is fitted into the socket at the housing to be nonrotatable and only movable axially of the horizontal shaft and supported to the horizontal shaft to be non-axially movable and rotatable only, and the adjusting means is provided between the housing and the cylindrical holder to adjust the axial position thereof, in other words, the axial position of the chain guide, and secondly, the spring is inserted into the cylindrical holder.

Accordingly, the adjusting means is operated to adjust the cylindrical holder in position with respect to the housing so as to enable the chain guide to be adjusted in its axial position with respect to the multistage sprocket assembly. Since the adjusting means can be disposed radially outwardly of the horizontal shaft, part of the derailleur including the horizontal shaft can be reduced in axial length. Since the cylindrical holder is axially movable with respect to the housing, in other words, the cylindrical holder, which can be larger in diameter than the horizontal shaft, is axially movable, the strength of the part including the horizontal shaft can be raised so as to improve overall durability to that extent. Also, the horizontal shaft and spring, which are housed in the cylindrical holder, can be protected thereby so as to avoid a malfunction caused by mud becoming attached to the horizontal shaft and spring.

In addition, in the present invention, the housing is provided at the movable member constituting the linkage mechanism. Some types of derailleurs swingably support to the base member the linkage mechanism comprising the support member swingably supported to the base member, a pair of linkage members and the movable member. In this case, the housing is provided at the support member.

The above and further objects and novel features of the invention will be more fully apparent from the following detailed description when the same is read in connection with the accompanying drawings.

BRIEF DESCRIPTION OF THE DRAWINGS

FIG. 1 is an enlarged sectional view of an embodiment of an adjusting mechanism of the invention, showing the principal portion only, FIG. 2 is a sectional view taken along line II—II in FIG. 1.

FIG. 3 is a front view of a derailleur applied with the adjusting mechanism of the invention, which is mounted on a fork end at the bicycle frame, FIG. 5 is an enlarged sectional view of a movable member only, FIG. 6 is an enlarged sectional view of a cylindrical holder only.

DETAILED DESCRIPTION OF THE INVENTION

Figure 4:
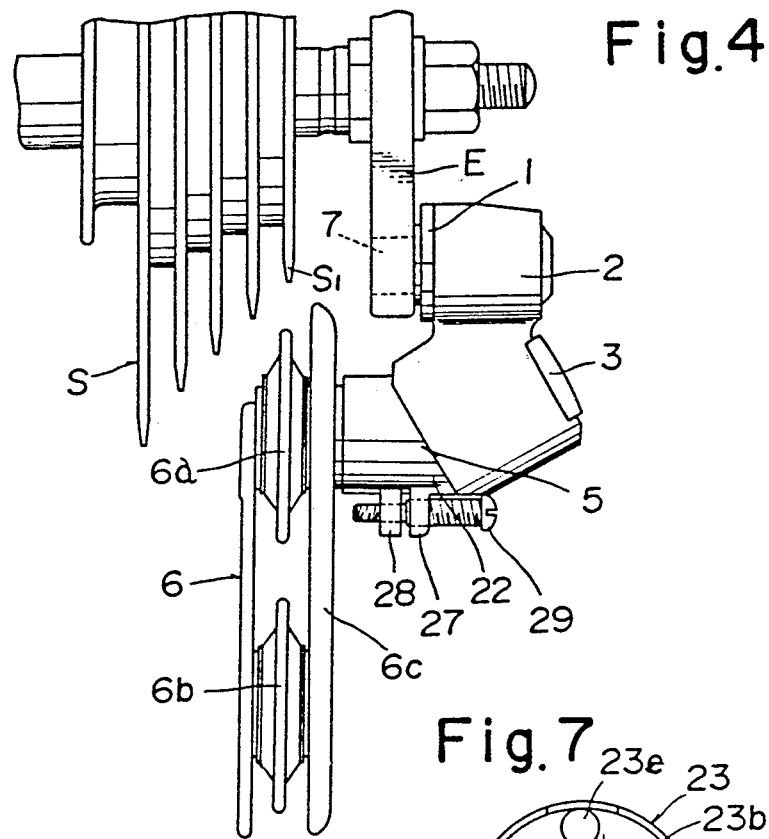
FIG. 4 is a side view of the derailleur of FIG. 3.

Referring to FIGS. 3 and 4, a rear derailleur is shown which includes an adjusting mechanism of the invention and is used together with a multistage sprocket assembly S mounted to a rear hub at the bicycle. The derailleur, as is well-known, is provided with a base member 1, a linkage mechanism A comprising a support member 2 and a pair of linkage members 3 and 4 and a movable member 5, and a chain guide 6 having a guide pulley 6a and a tension pulley 6b, with the support member 2 being supported swingably to the base member 1 through a first horizontal shaft 7, the chain guide 6 being supported swingably to the movable member 5 through a second horizontal shaft 8. A first spring 9 is interposed between the base member 1 and the linkage mechanism A, and a second spring 10 is interposed between the movable member 5 and the chain guide 6, so that the first and second springs 9 and 10 balance with each other to set the guide pulley 6a in its radial position with respect to the multistage sprocket assembly S.

The base member 1 comprises a plate having a through bore and a stopper abutting against a projection at a mounting portion integral with a fork end H at the bicycle frame. The through bore is rotatably supported onto the first horizontal shaft 7, so that the stopper abutting against the projection restrains the base member 1 from rotation in one direction with respect to the fork end H. The first horizontal shaft 7 is screwably mounted to a threaded bore at the mounting portion.

The support member 2 comprises a cylindrical boss 2a rotatably supported to the first horizontal shaft 7 and a support 2b swingably supporting the linkage members 3 and 4 through a pair of pins 11 and 12.

Also, the movable member 5 is pivoted to free ends of the linkage members 3 and 4 through a pair of pins 13 and 14.

The chain guide 6 comprises a guide pulley 6a, a tension pulley 6b and a guide frame 6c supporting both the pulleys 6a and 6b, the guide frame 6c being fixed at on end to the axial end of the second horizontal shaft 8. Pulleys 6a and 6b engage with the driving chain in an inverse-S-like manner, thereby guiding the chain to a desired sprocket of the multistage sprocket assembly.

The embodiment of the invention shown in FIGS. 1 and 2 is intended to adjust the chain guide 6 in its axial position with respect to the movable member 5. A housing 22 having a socket 21, as shown in FIG. 5, is formed integrally with the movable member 5. Guide frame 6c of the chain guide 6 is fixed to the second horizontal shaft 8, and the chain guide 6 together therewith is made axially adjustable with respect to the housing 22.

The socket 21 extends axially of the second horizontal shaft 8, is open at its surface opposite to the chain guide 6, and has an outer diameter considerably larger than that of the second horizontal shaft 8.

Figure 7:
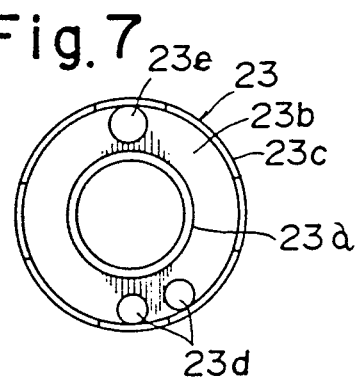
FIG. 7 is a bottom view thereof.
Figure 8:
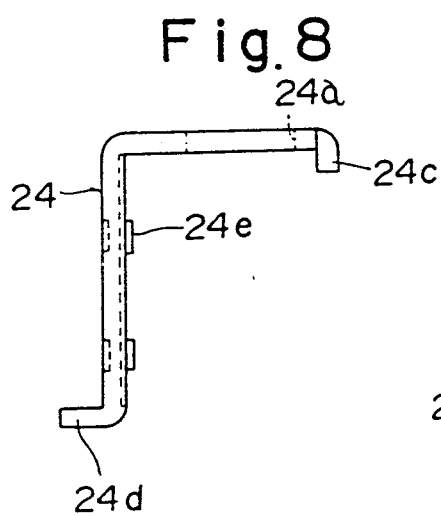
FIG. 8 is an enlarged side view of a locking member only.

A cylindrical holder 23, as shown in FIGS. 6 and 7, comprises a top 23b having a bearing cylinder 23a rotatably fitted on the second horizontal shaft 8 and a cylindrical portion 23c, and is fitted into the socket 21 non-rotatably and axially movably only through a locking member 24 shown in FIG. 8 and supported to the second horizontal shaft 8 to be non-axially-movable but rotatable through the bearing cylinder 23a.

Figure 9:
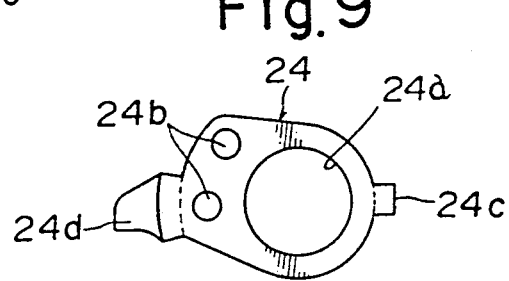
FIG. 9 is a plan view thereof.

In greater detail, the socket 21 is provided with an axially extending guide groove 25 as shown in FIG. 5. Locking member 24 has a smaller width than guide groove 25 and is movable along the guide groove 25. Locking member 24 is formed and mounted on one side of the cylindrical holder 23 and is fitted into the guide groove 25. At the top 23b of the cylindrical holder 23 are provided with a plurality of retaining bores 23d for retaining one end of the second spring 10 as shown in FIG. 7 and one fitting bore 23e. The locking member 24, as shown in FIGS. 8 and 9, is provided at one end with a disc having a shaft bore 24a corresponding to a shaft bore of the bearing cyinder 23a and retaining bores 24b corresponding to the retaining bores 23d and a projection 24c engageable with the fitting bore 23e, and at the other end with a stopper 24d engageable with a rotation regulation element (not shown) with respect to the guide frame 6c at the chain guide 6. Also, the locking member 24 is provided with a plurality of projections 24e. The projections 24e engage with engaging bores 23f at the cylindrical holder 23 respectively and the projection 24c engages with the bore 23e of holder 23, whereby the locking member 24 couples with the cylindrical holder 23. Alternatively, the locking member may be integral with the cylindrical holder 23.

The second horizontal shaft 8 is caulked at one axial end to the guide frame 6c at the chain guide 6 and is provided at its other axial end with an annular groove 8a as shown in FIGS. 1 and 2. The second horizontal shaft 8, after being fitted into the shaft bores of the bearing cylinder 23a and locking member 24, is retained by a snap ring 26, thereby supporting the cylindrical holder 23 rotatably and non-axially-movably with respect to the horizontal shaft 8.

Also, the cylindrical holder 23, as shown in FIGS. 1 and 2, houses therein the second spring 10. First and second support tongues 27 and 28 having threaded bores 27a and 28a are provided at one-side walls of the housing 22 and cylindrical holder 23 respectively. An adjusting screw 29 is inserted into support tongues 27 and 28. Adjusting screw 29 adjusts the axial position of cylindrical holder 23 with respect to the housing 22, thereby constituting an adjusting means.

The threaded bores 27a and 28a have different spiral directions relative to each other, and the adjusting screw 29 is provided at its root and fore ends with screw threads 29a and 29b different in spiral direction from each other corresponding to the threaded bores 27a and 28a respectively. Adjusting screw 29 is operated to axially move the cylindrical holder 23 away from or toward the housing 22.

The second spring 10 comprises a coil spring having a coiled portion and first and second ends, the coiled portion being fitted around the second horizontal shaft 8, the first end being retained into one retaining bore 23d of cylindrical holder 23, and the second end being retained into a retaining bore 6d provided at the guide frame 6c.

In addition, in FIGS. 1 and 2, reference numeral 30 designates a cup fitted into the end of cylindrical holder 23.

The rear derailleur shown in FIGS. 3 and 4 is constructed such that the pair of pins 11 and 12 connecting the linkage members 3 and 4 to the support member 2 and the pair of pins 13 and 14 connecting the movable member 5 to the linkage members 3 and 4, are slanted with respect to the plane perpendicular to the axis of the multistage sprocket assembly, so that, when the driving chain is shifted, the chain guide 6 is moved radially of the multistage sprocket assembly in the plane perpendicular to the axis thereof simultaneously with the movement of chain guide 6 in parallel to the axis of the same.

The cylindrical holder 23 is incorporated with the housing 22 such that the bearing cylinder 23a is fitted onto the second horizontal shaft 8 which is fixed at one end thereof to the guide frame 6c. Snap ring 26 rotatably mounts the cylindrical holder 23 to the second horizontal shaft 8. Locking member 24, which is coupled with the cylindrical holder 23, is fitted into the guide groove 25 of housing 22. Cylindrical holder 23 is inserted into the socket 21 so that the cylindrical holder 23 is restrained from rotation with respect to the housing 22 and allowed only to move axially. Second support tongue 28 of cylindrical holder 23 is fitted into a slot 31 provided at one side of the housing 22, and the adjusting screw 29 screws with the threaded bore 27a and 28a at the support tongues 27 and 28 respectively.

Now, referring to FIGS. 3 and 4, the first horizontal shaft 7 screws with the threaded bore at the mounting portion integral with the fork end H, and the chain guide 6 is disposed corresponding to a smaller diameter sprocket S1 of multistage sprocket assembly S, thereby mounting to the bicycle frame the derailleur incorporating therewith the adjusting mechanism constructed as described above.

A control wire W, which is fixed to the linkage member 3 through a fixture 15, is pulled to deform the linkage member A against a return spring (not shown) to thereby move the chain guide 6 toward a larger diameter sprocket and is released to return the chain guide 6 due to the bias of the return spring to the axial position corresponding to the smaller diameter sprocket S1.

In a case where the chain guide 6 is not properly axially positioned with respect to the multistage sprocket assembly S due to use of a different kind of sprocket assembly, the adjusting screw 29 is rotated to axially move the cylindrical holder 23 with respect to the housing 22, thereby adjusting the axial position of the cylindrical holder 23 with respect to housing 22. Thus, the cylindrical holder 23 is adjusted in position to axially move the chain guide 6 with respect to the smaller diameter sprocket S1, thereby adjusting the chain guide 6 in its axial position with respect thereto.

Since the adjusting screw 29 is provided radially outwardly from the housing 22 and cylindrical holder 23, the derailleur has a reduced axial length at the second horizontal shaft 8 portion and is effectively prevented from being hit by external objects.

Also, the movable member 5 is provided with the housing 22 and the cylindrical holder 23 movable with respect thereto, the cylindrical holder 23 being supported to the chain guide 6 through the second horizontal shaft 8. In other words, the second horizontal shaft 8 can be supported at a portion larger in diameter than the shaft movably with respect to the housing 22 through the cylindrical holder 23, whereby the second horizontal shaft 8 portion of the derailleur can be provided with increased strngth and a problem of backlash of the chain guide 6 to the movable member 5 is reduced.

Also, the second horizontal shaft 8 and second spring 10 housed in the socket 21 at the housing 22 can be protected with the housing 22 and cylindrical holder 23.

Alternatively, a tightening screw is screwably mounted to one side of the cylindrical holder 23 and a guide bore extending axially of the housing 22 and receiving the tightening screw may be provided at one side of the housing 22 so that the tightening screw may be screwably tightened to hold the cylindrical holder 23 in an adjusted position with respect to the housing 22. Thus, the adjusting structure is not limited to the above-described constructions.

Figure 10:
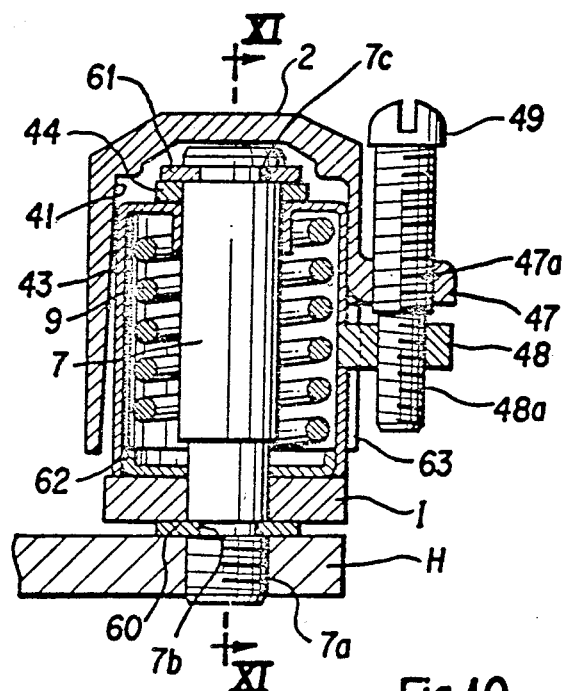
FIG. 10 is an enlarged sectional view of another embodiment of an adjusting mechanism of the invention.
Figure 11:
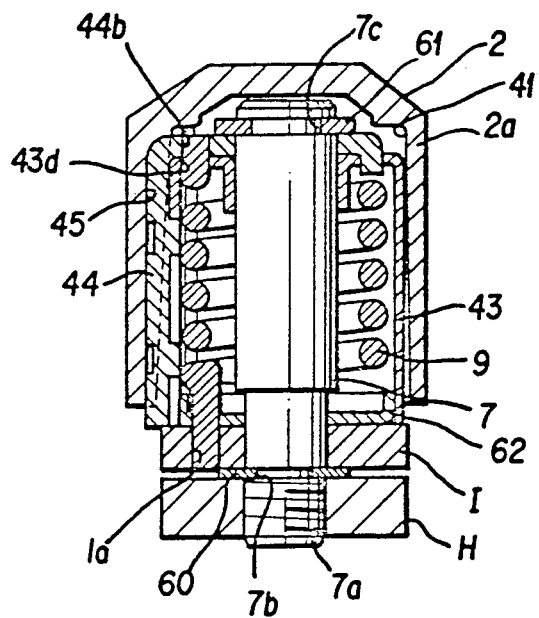
FIG. 11 is a sectional view taken along line XI—XI of FIG. 10.

Alternatively, as shown in FIGS. 10 and 11, the support member 2 may be provided with a housing, and a cylindrical holder 43 to be inserted into the housing may be rotatably supported thereto through the first horizontal shaft 7 fixed to the base member 1. First spring 9 may be interposed between the cylindrical holder 43 and the base member 1 so as to adjust the chain guide 6 in axial movement. In this case, an adjusting mechanism is provided which is of the same structure as that in FIGS. 1 and 2 and the base member serves as the horizontal shaft side member.

In more detail, in the FIGS. 10–11 embodiment, cylindrical holder 43 is inserted in socket 41 of cylindrical boss 2a of support member 2 and is rotatably supported via first horizontal shaft 7 which is screwed to and substantially fixed to a mounting portion of fork end H by means of base member 1 and a stopper abutting against a projection at fork end H. A first spring 9 is interposed between cylindrical holder 43 and base member 1. Boss 2a of the support member and cylindrical holder 43 are respectively provided at one end thereof with a first support tongue 47 and a second support tongue 48 having threaded bores 47a and 48a respectively, into which adjusting screw 49 screws. By adjustment of adjusting screw 49, the entire linkage mechanism A can be moved axially with respect to base member 1, and thereby chain guide 6, which is supported by the movable member of linkage mechanism A, can be adjusted with respect to its axial position.

It should be noted that the embodiment of FIGS. 10 and 11 is structured similarly to that of the first embodiment of FIGS. 1 and 2. Socket 4 of boss 2a is provided with a guide groove 45 to which a locking member 44 is fitted to be capable of moving therealong. Locking member 44 is connected to one side of cylindrical holder 43 in the same manner as in the first embodiment. First spring 9 is housed in cylindrical holder 43, one end of which is retained to retaining bores 43d and 44b provided at the top of cylindrical holder 43 and at locking member 44 respectively, and the other end of which is retained to a retaining bore 1a at base member 1. First horizontal shaft 7 is provided at one axial end thereof with a threaded portion 7a screwable into fork end H. At the root end of threaded portion 7a is provided an annular groove 7b to which a snap ring 60 is fitted. First horizontal shaft 7 is provided at its other axial end with an annular groove 7c, to which a snap ring 61 is fitted. Cylindrical holder 43 is thus supported through horizontal shaft 7 such that it is rotatable but axially non-movable. In FIGS. 10 and 11, reference numeral 62 relates to a cap fitted to the end portion of cylindrical holder 43 and reference numeral 63 denotes a slot 63 which is provided at cylindrical boss 2a.

Also, a derailleur applied with the present invention may alternatively omit first spring 9 but include second spring 10 only, or the base member 1 of the derailleur may be fixed to the fork end H by tightening a nut screwable with an axial end of a hub shaft at a rear hub.

As is apparent from the above description, the present invention operates the adjusting means to adjust the chain guide 6 in its axial position with respect to the multistage sprocket assembly. Cylindrical holder 23, which is fitted into the socket 21 of the housing 22, is supported rotatably and non-axially-movably onto a horizontal shaft 7 or 8. A spring 9 or 10 is interposed between the cylindrical holder 23 and the horizontal shaft side member (the guide frame 6c of chain guide 6, or the base member 1) fixed to the horizontal shaft 7 or 8, and the adjusting means for adjusting the cylindrical holder 23 in its axial position with respect to the housing 22 is provided between the housing 22 and the cylindrical holder 23, so that the adjusting means can be disposed radially outwardly of the horizontal shaft, whereby the horizontal shaft portion of the derailleur can have a reduced axial length and is effectively prevented from being hit by external objects.

Furthermore, the cylindrical holder 23 can move axially of the housing 22 to adjust the chain guide in its axial position. In other words, the chain guide 6 can be moved through a portion larger in diameter than the horizontal shaft 8, whereby the horizontal shaft 8 can have improved durability. Also, the horizontal shaft 8 and spring 10 can be protected by the cylindrical holder 23 and housing 22, thereby avoiding a malfunction caused by mud which might otherwise become attached to the horizontal shaft 8 and spring 10.

While a preferred embodiment of the invention has been described using specific terms, such description is for illustrative purpose only, and it is to be understood that changes and variations may be made without departing from the spirit or scope of the following claims.

What is claimed is:

1. An adjusting mechanism for adjusting an axial position of a chain guide of a bicycle derailleur with respect to a multistage sprocket assembly of the bicycle, said mechanism comprising:
   (a) a horizontal shaft adapted to have its axis extend parallel to an axial direction of said multistage sprocket assembly and for supporting said chain guide;
   (b) a housing having a socket for receiving therein said horizontal shaft and moving therearound relative to said chain guide;
   (c) a cylindrical holder supported in said socket to be movable axially of and non-rotatable relative to said housing and supported to said horizontal shaft to be non-axially-movable and rotatable relative thereto;
   (d) a spring provided with a coiled portion inserted into said cylindrical holder, a first end retained to said cylindrical holder, and a second end adapted to be retained to one of said horizontal shaft or a member fixed to said horizontal shaft; and
   (e) an adjusting means provided between said housing and said cylindrical holder for adjusting said cylindrical holder in its axial portion with respect to said housing to adjust said chain guide in its axial portion relative to said sprocket assembly.

2. An adjusting mechanism according to claim 1, wherein said housing is provided at the outside thereof with a first support tongue having a threaded bore, said cylindrical holder being provided at the outside thereof with a second support tongue opposite to said first support tongue and having a threaded bore, said adjusting means being provided with an adjusting screw screwable with said threaded bores at said support tongues.

3. An adjusting mechanism according to claim 2, wherein said threaded bores at said support tongues are reverse to each other in the spiral direction, said adjusting screw being provided at the root and the fore end portion with screw threads each in the spiral direction corresponding to each of said threaded bores.

4. An adjusting mechanism according to claim 1, wherein said housing is provided with a guide groove for axially guiding said cylindrical holder, said cylindrical holder being provided with a locking member to be fitted into said guide groove.

5. An adjusting mechanism according to claim 1, wherein said derailleur is provided with a linkage mechanism comprising a support member, a pair of linkage members and a movable member, said chain guide being provided with a guide frame, said movable member being provided with said housing, and said guide frame being fixed to said horizontal shaft.

6. A bicycle derailleur comprising an adjusting mechanism for adjusting an axial position of a chain guide of a bicycle derailleur with respect to a multistage sprocket assembly of the bicycle, said mechanism comprising:
   (a) a horizontal shaft adapted to have its axis extend parallel to an axial direction of said multistage sprocket assembly;
   (b) a housing having a socket for receiving therein said horizontal shaft and moving therearound relative to said chain guide;
   (c) a cylindrical holder supported in said socket to be movable axially of and non-rotatable relative to said housing and supported to said horizontal shaft to be non-axially-movable and rotatable relative thereto;
   (d) a spring provided with a coiled portion inserted into said cylindrical holder, a first end retained to said cylindrical holder, and a second end adapted to be retained to one of said horizontal shaft or a member fixed to said horizontal shaft; and
   (e) an adjusting means provided between said housing and said cylindrical holder for adjusting said cylindrical holder in its axial portion with respect to said housing to adjust said chain guide in its axial portion relative to said sprocket assembly, wherein said derailleur is provided with a base member and a linkage mechanism comprising a support member swingably supported to said base member, a pair of linkage members and a movable member supporting said chain guide, said housing being provided at said support member, and said horizontal shaft being fixed to said base member.

* * * * *